US012705301B2

(12) United States Patent
Ushijima-Mwesigwa et al.

(10) Patent No.: US 12,705,301 B2
(45) Date of Patent: Aug. 11, 2026

(54) ANALYSIS OF CLUSTERED DATA

(71) Applicant: FUJITSU LIMITED, Kawasaki (JP)

(72) Inventors: Hayato Ushijima-Mwesigwa, San Jose, CA (US); Xiaoyuan Liu, Pendleton, SC (US); Avradip Mandal, San Jose, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 1087 days.

(21) Appl. No.: 17/751,436

(22) Filed: May 23, 2022

(65) Prior Publication Data

US 2023/0376569 A1 Nov. 23, 2023

(51) Int. Cl.
*G06N 10/60* (2022.01)
*G06F 17/11* (2006.01)

(52) U.S. Cl.
CPC ............ *G06F 17/11* (2013.01); *G06N 10/60* (2022.01)

(58) Field of Classification Search
CPC ........ G06N 20/00; G06N 3/045; G06N 5/022; G06N 5/01; G06N 3/088; G06N 3/08; G06N 5/04; G06N 3/084; G06N 7/01; G06N 3/048; G06N 5/02; G06N 20/20; G06N 5/048; G06N 20/10; G06N 3/02; G06N 3/04; G06N 3/042; G06N 3/044; G06N 3/0442; G06N 3/047; G06N 3/0499; G06N 3/091; G06N 5/025; G06F 16/285; G06F 18/2323; G06F 16/9024; G06F 18/2115; G06F 16/906; G06F 18/2185; G06F 18/231; G06F 17/11; G06F 17/16; G06F 18/23213; G06F 16/28; G06F 17/18; G06F 18/2155; G06F 18/22; G06F 18/23; G06F 7/24; G06F 16/212; G06F 16/22; G06F 16/2425; G06F 16/248;

(Continued)

(56) References Cited

U.S. PATENT DOCUMENTS

2016/0110497 A1* 4/2016 Dzakula ................ G16B 40/00 702/20
2018/0075342 A1 3/2018 Tamura (Continued)

OTHER PUBLICATIONS

European Search Report dated Sep. 11, 2023 as received in application No. 23168705.4.

(Continued)

*Primary Examiner* — Luis A Sitiriche
(74) *Attorney, Agent, or Firm* — Maschoff Brennan

(57) ABSTRACT

A method may include obtaining a set of tags and a set of items in which each item is pre-sorted into a cluster and each item corresponds to one or more tags. The method may include generating a bipartite graph that includes the set of tags as a first set of nodes and the clusters of items as a second set of nodes. Relationships between tags and items may be represented as edges between the first nodes and the second nodes. The bipartite graph may be modeled as a quadratic programming formulation, and cluster descriptor sets that each include one or more of the tags may be determined by solving the quadratic programming formulation of the bipartite graph, each of the cluster descriptor sets providing an explanation of how one or more clusters of items were pre-sorted. The method may include analyzing the items based on the luster descriptor sets.

12 Claims, 5 Drawing Sheets

(58) Field of Classification Search
CPC ...... G06F 16/284; G06F 16/34; G06F 16/345; G06F 16/353; G06F 16/38; G06F 16/9027; G06F 16/903; G06F 16/9035; G06F 16/9536; G06F 17/10; G06F 17/142; G06F 18/214; G06F 18/2148; G06F 18/2193; G06F 18/2413; G06F 18/24137; G06F 18/25
See application file for complete search history.

(56) References Cited

U.S. PATENT DOCUMENTS

| | | | | |
|---|---|---|---|---|
| 2018/0107172 | A1 | 4/2018 | Takatsu | |
| 2021/0192282 | A1* | 6/2021 | Goodsitt | G06F 16/9027 |

OTHER PUBLICATIONS

Liu, "Combinatorial Optimization Algorithms On Quantum and Quantum Inspired Devices" 2021.

Sambaturu, Prathyush, et al. "Efficient algorithms for generating provably near-optimal cluster descriptors for explainability." Proceedings of the AAAI Conference on Artificial Intelligence. vol. 34. No. 02. 2020.

Davidson, Ian, Antoine Gourru, and S. Ravi. "The cluster description problem-complexity results, formulations and approximations." Thirty-second Conference on Neural Information Processing Systems. 2018.

* cited by examiner

ANALYSIS OF CLUSTERED DATA

The present disclosure generally relates to analysis of clustered data.

BACKGROUND

Data points may be presented as multiple nodes included in a dataset referred to as a graph. Nodes included in a particular graph may include various different intrinsic properties that describe characteristics of each node in the particular graph. Additionally, one or more of the nodes may be related to one or more other nodes in the particular graph; such relationships between nodes may be indicated by and represented as edges connecting the related nodes. Nodes included in a particular graph may be grouped together in one or more clusters of nodes according to similarities and differences between the intrinsic properties of the nodes or the edges between the nodes.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a set of tags and a set of items in which each item is pre-sorted into a cluster and each item corresponds to one or more tags. The method may include generating a bipartite graph that includes the set of tags as a first set of nodes and the clusters of items as a second set of nodes. Relationships between tags and items may be represented as edges between the first nodes and the second nodes. The bipartite graph may be modeled as a quadratic programming formulation, and one or more cluster descriptor sets that each include one or more of the tags may be determined based on solving the quadratic programming formulation of the bipartite graph, each of the cluster descriptor sets providing an explanation of how one or more clusters of items were pre-sorted. The method may include analyzing the items based on the luster descriptor sets.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Datasets that include multiple data points with various relationships between each of the data points may be represented as a graph in which each of the data points is represented by a node included in the graph, and each relationship between any two particular nodes is represented by an edge connecting the two particular nodes. Analysis of the graph may involve grouping the data points into one or more clusters of nodes to make the graph more interpretable for a user. However, identifying similarities and grouping the nodes by the user may be challenging because graphs may be highly complex and include a large number of nodes and an even larger number of edges connecting the various nodes.

Machine learning methods and artificial intelligence systems may be used to group the nodes into various clusters according to the various characteristics and complex relationships between the nodes. However, unsupervised machine learning processes may generate cluster groupings that provide few, if any, indications regarding why particular nodes are included in the same cluster, which may make interpretation and analysis of the clustered nodes difficult for the user.

Providing an explanation or identifying descriptors of the clustered nodes may facilitate and improve post-clustering analysis of the graph. The present disclosure relates to, among other things, analysis of node clusters. The analysis may include generating a cluster descriptor corresponding to each respective group of clustered nodes of a particular graph in which each of the cluster descriptors includes one or more tags that are associated with one or more nodes of the particular graph. Generating cluster descriptors according to the present disclosure may involve identifying tags that cover a threshold number of the clustered nodes while also reducing the number of tags used in the cluster descriptors as much as possible. Consequently, the cluster descriptors generated according to the present disclosure may provide more pertinent and useful explanations of how nodes of a particular graph are clustered with fewer tags included in the cluster descriptors. The generated cluster descriptors may be an improvement over cluster descriptors generated according to existing clustering explanation processes, such as solving a disjoint tag descriptor minimization problem or a minimum constrained cluster description problem.

Embodiments of the present disclosure are explained with reference to the accompanying figures.

Figure 1:
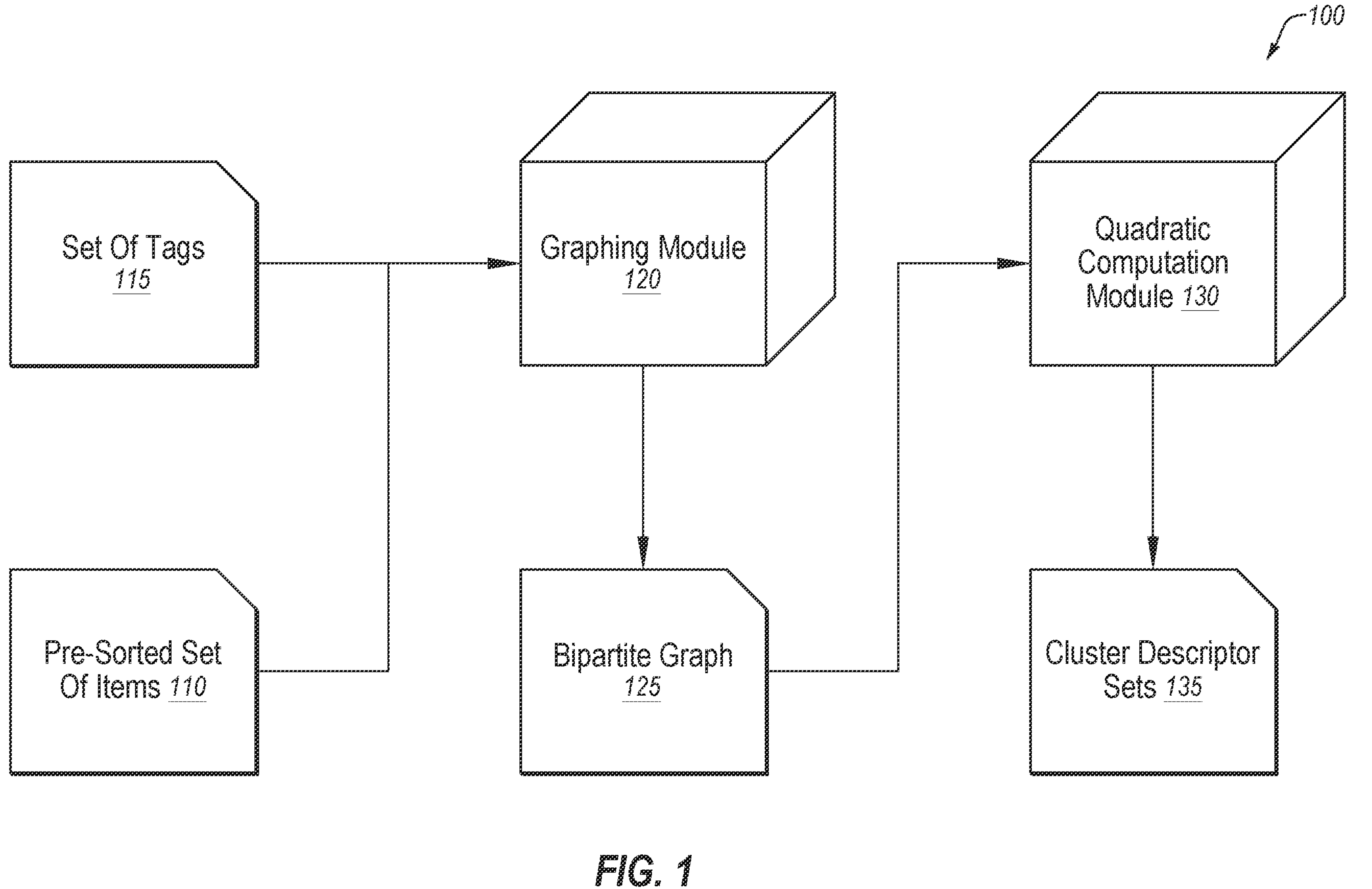
FIG. 1 is a diagram of an example embodiment of a computer system configured to generate cluster descriptors according to the present disclosure.

FIG. 1 is a diagram of an example embodiment of a computer system 100 configured to generate cluster descriptor sets 135 according to the present disclosure. The computer system 100 may include a graphing module 120, a quadratic computation module 130, and any other computing modules so that the computer system 100 may be configured to generate the cluster descriptor sets 135 based on obtaining a pre-sorted set of items 110 and a set of tags 115. Elements of the system 100, including, for example, the graphing module 120 and/or the quadratic computation module 130 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the pre-sorted set of items 110, the set of tags 115, the bipartite graph 125, and/or the cluster descriptor sets 135 as described in further detail below in relation to method 400 of FIG. 4.

An example of the computer system 100 that is configured to perform operations with respect to the pre-sorted set of items 110, the set of tags 115, the bipartite graph 125, and/or the cluster descriptor sets 135 may include a digital annealer that includes Ising units is provided in U.S. Publication No. 2018/0075342, filed on Aug. 30, 2017 and incorporated in this disclosure in its entirety. As described in U.S. Publication No. 2018/0075342, the Ising units may include an energy value calculation circuit and a state transition determination circuit. The energy value calculation circuit may be configured to calculate an energy value, which is based on a value of one or more of the elements a quadratic programming formulation, such as the quadratic programming formulation described at least in relation to Equation (4) below, that may be used to generate the output of the computer system 100. The output may include one or more of the cluster descriptor sets 135 to the problem represented by optimization (e.g., minimization or maximization) of the quadratic programming formulation. Additional information and examples of the state transition determination circuit is provided in U.S. Publication No. 2018/0107172, filed on Sep. 28, 2017 and incorporated in this disclosure in its entirety.

In some embodiments, the graphing module 120 may be configured to generate a bipartite graph 125 based on the pre-sorted set of items 110 and the set of tags 115. Items from the pre sorted set of items 110 may be any item from a data set. In some embodiments, each of the items may be represented by a node in a graph. For example, the items may be users in a social network, genes from gene sequences, images in a data set of images, atoms in a molecule, among any other type of data from data set. In these and other embodiments, clusters of the nodes, i.e., items may be formed based on an analysis of the graph. For example, a machine learning method and/or an artificial intelligence system may be used to analyze the graph and cluster the nodes, i.e., items, based on some characteristic of each of the items. In some instances, the machine learning method and/or the artificial intelligence system may cluster the items in ways that are not understandable or discernable by a human user analyzing the clustered items. The machine learning method and/or the artificial intelligence system may be trained to sort and cluster nodes of graph datasets according to characteristics of the nodes included in one or more training graph datasets. However, a user analyzing the graph dataset that is clustered by the machine learning method and/or the artificial intelligence system may not be the same user who trained the machine learning method and/or the artificial intelligence system or knowledge about how the machine learning method and/or the artificial intelligence system was trained. For example, a particular pre-sorted set of items may include various user accounts of a social media platform (e.g., FACEBOOK® or TWITTER®) that are organized into two or more different clusters in which each user account is included in one of the clusters. In this and other examples, the two or more different clusters of user accounts may be clustered based on characteristics such as user age, user gender, user affiliations and/or preferences regarding particular topics, user participation in particular groups or organizations, frequency of user engagement with the social media platform, analysis of user content posted to the social media platform, or any other characteristics that may distinguish and/or indicate similarities between a first user account and a second user account. In these and other embodiments, the set of items 110 may be pre-sorted based on the clustering of the items. Thus, the pre-sorting of the items 110 may be performed by a clustering algorithm performed by a machine learning method and/or an artificial intelligence system.

In some embodiments, a machine learning method and/or an artificial intelligence system may not provide an explanation regarding which characteristics of the items resulted in the clustering of the items. As such, the items may be clustered but the basis why a certain item is grouped with other items in a cluster may not be understood. Thus, the items 110 being presorted does not indicate that there is an understanding for the basis for the presorting.

In some embodiments, the pre-sorted set of items 110 may be considered a ground truth input to the graphing module 120, which may indicate that the clustering of each of the items included in the pre-sorted set of items 110 is assumed to be static and may not change during generation of the bipartite graph 125 or the cluster descriptor sets 135.

The set of tags 115 may include one or more tags that are associated with each of the items included in the pre-sorted set of items 110. In some embodiments, a subset, $t_i$, of the set of tags 115, T (i.e, $t_i \subseteq T$), may be associated with each item, $s_i$, included in the pre-sorted set of items 110, S (i.e., $s_i \in S$). A descriptor set of tags, $T_l$, included in the set of tags 115 (i.e., $T_l \subseteq T$) may cover each item, $s_i$, included in a cluster of items, $C_l$, according to the pre-sorting of the set of items 110 if the descriptor set of tags includes at least one tag, $t_i$, that is associated with the item, $s_i$. Thus, the descriptor set of tags, $T_l$, is considered to cover the cluster of items, $C_l$, if each item included in the cluster of items is covered by tags included in the descriptor set of tags, $T_l$.

In some embodiments, each tag included in the set of tags 115 may be a characteristic on which pre-sorting of the set of items 110 may be based. For example, a particular set of items may relate to molecular compounds in which each item in the set of items represents a particular molecular compound. A particular set of tags associated with the particular set of items may include patterns of atoms that are included in one or more of the molecular compounds represented by the particular set of items (i.e., molecular functional groups). In this and other examples, each tag (representing a molecular functional group) may be a characteristic that describes one or more molecular compounds that are represented by the items included in the particular set of items.

Each tag included in the set of tags 115 may be represented as a node in a graph associated with the graph that represents the clustered nodes corresponding to the pre-sorted set of items 110. Additionally or alternatively, each tag included in the set of tags 115 may be represented as a node in the same graph as the pre-sorted set of items 110. The graphing module 120 may generate the bipartite graph 125 in which the bipartite graph 125 includes a first node type corresponding to item nodes based on the pre-sorted set of items 110 in which nodes of the first node type (i.e., the item nodes) are sorted into one or more clusters and a second node type corresponding to tags from the set of tags 115. Additionally or alternatively, the bipartite graph 125 may include an association and/or a relationship between each node of the second node type and one or more nodes of the first node type. Additionally or alternatively, the bipartite graph 125 may include no associations and/or relationships between nodes of the second node type and between nodes of the first node type. Organizing the item nodes and the tag nodes as the bipartite graph 125 as described above may facilitate representation of relationships between the tag nodes and the item nodes that may indicate why the item nodes were sorted into particular clusters. Organizing the graph as the bipartite graph 125 may facilitate clearer distinction between the clustered item nodes and the tag nodes that may explain the clustering of the item nodes and identification of the tag nodes that explain clustering of the item nodes.

Figure 2:
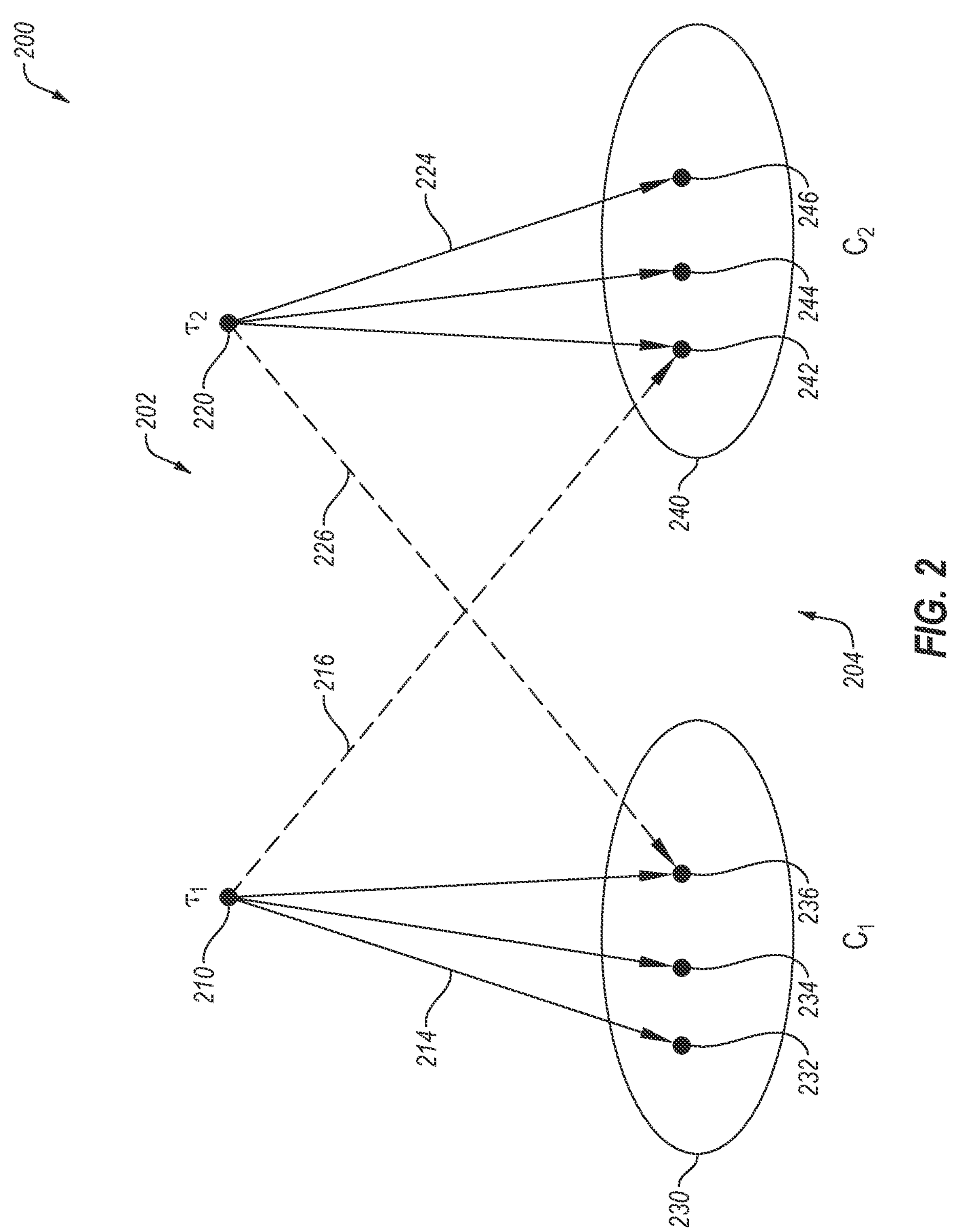
FIG. 2 illustrates a first example of two tag groups being applied to two clusters of nodes and explanation of the two clusters based on the two tag groups according to the present disclosure.

For example, FIG. 2 illustrates a bipartite graph 200 that includes a first tag 210 and a second tag 220. The bipartite graph 200 may further include a first cluster of nodes 230 and a second cluster of nodes 240. The first cluster of nodes 230 includes items 232, 234, and 236 and the second cluster of nodes 240 includes items 242, 244, and 246. The first tag 210 may be associated with items 232, 234, and 236 by edges 214 and with item 242 by edge 216, while the second tag 220 may be associated with items 236, 242, and 244 by edges 224 and with item 246 by edge 226. The bipartite graph 200 may illustrate the association between the first tag 210 and the second tag 220 and the items 232, 234, 236, 242, 244, and 246 based on the edges connecting the first tag 210 and the second tag 220 and the items 232, 234, 236, 242, 244, and 246. In these and other embodiments, the bipartite graph 200 may be considered a bipartite graph because the tags 210 and 220 are separated into a first disjointed group 202 of graph nodes, and the items 232, 234, 236, 242, 244, and 246 are separated into a second disjointed group 204 of graph nodes. The groups 202 and 204 may be disjointed because edges indicating relationships between the graph nodes, such as the tags 210 and 220 and the items 232, 234, 236, 242, 244, and 246, only exist between nodes included in the first disjointed group 202 and nodes included in the second disjointed group 204 with no edges connecting nodes included in the same disjointed group.

Returning to the description of FIG. 1, the bipartite graph 125 generated by the graphing module 120 may be obtained by the quadratic computation module 130, and cluster descriptor sets 135 corresponding to each cluster of items included in the pre-sorted set of items 110 may be determined. In some embodiments, the quadratic computation module 130 may be configured to model the bipartite graph 125 as a quadratic unconstrained binary optimization (QUBO) problem and solve the QUBO problem to determine the cluster descriptor sets 135. The cluster descriptor sets 135 may be groups of tags determined by the quadratic computation module 130 as providing an explanation for clustering of the items. In other words, each cluster descriptor set 135 may include one or more tags that provide a possible explanation of why one or more items were included in the same cluster during pre-sorting of the set of items 110. In these and other embodiments, the cluster descriptor sets 135 may be considered explanations of the various groupings of the clusters included in the pre-sorted set of items 110 because each of the tags included in a particular cluster descriptor set is related to at least one item included in a corresponding particular item cluster. In that sense, the tags of the particular cluster descriptor set explain why the items were grouped together in the particular item cluster without knowing how a machine learning process and/or an artificial intelligence system clustered the items during the pre-sorting process.

In some embodiments, the bipartite graph 125 may be modeled to include one or more binary variables that may be optimized to convert the quadratic programming formulation that represents the bipartite graph 125 into a QUBO problem. The quadratic computation module 130 may then determine one or more cluster descriptor sets 135 by optimizing a value (i.e., minimizing the value or maximizing the value) of the QUBO problem. In these and other embodiments, the QUBO problem representing the bipartite graph 125 may include one or more weighted terms that indicate desirable and/or undesirable traits relating to the cluster descriptor sets 135. Optimization of the QUBO problem may account for the weighted terms by representing the desirable traits as contributing towards the optimization of the QUBO problem while penalizing the undesirable traits with respect to the optimization. For example, having a particular cluster descriptor set include fewer tags (i.e., a size of the cluster descriptor set including e.g., one, two, three, or four tags) and having the particular cluster descriptor set cover a majority of the items (i.e., a tag coverage including e.g., 70%, 80%, 90%, or 95% of the items) may be considered desirable traits, while the particular cluster descriptor set including particular tags that include edges relating the particular tags to item nodes in multiple different clusters (i.e., a low tag modularity) may be considered an undesirable trait. In this and other examples, the size of the cluster descriptor sets may be represented by a first variable in the QUBO problem in which a greater value of the first variable detracts from optimization of the QUBO problem, while the tag coverage and the tag modularity of the cluster descriptor set may be represented as second and third variables, respectively, in which a greater value of the second variable and a greater value of the third variable contributes to optimization of the QUBO problem.

In these and other embodiments, a first binary function associated with the set of tags 115, $x_l(j)$, may be represented as:

$$x_l(j) = \begin{cases} 1, \text{ if tag } j \text{ is assigned to the descriptor } T_l \text{ of } C_l \\ 0, \text{ otherwise} \end{cases}, \tag{1}$$

A second binary function associated with the pre-sorted set of items 110, z(i), may be represented as:

$$z(i) = \begin{cases} 1, \text{ if object } s_i \in S \text{ is covered} \\ 0, \text{ otherwise} \end{cases}, \tag{2}$$

Additionally or alternatively, a tag modularity metric may be included in the modeled QUBO problem. Tag modularity may be a measurement that quantifies an extent to which nodes of a particular graph are divided into clusters. A first node clustering with high modularity indicates that a number of internal edges between nodes included in the first node clustering is greater than a number of external edges connecting nodes included in the first node clustering to nodes outside of the first node clustering. In contrast, a second node clustering with low modularity may include fewer connections within the second node clustering than connections between the nodes of the second node clustering and external nodes. Because the clustering of the nodes in the pre-sorted list of items 110 is already known and fixed and the graph is organized as the bipartite graph 125, the tag modularity metric may measure the connectedness between the tag nodes and the item nodes. Accordingly, tag modularity, TM, may be represented as:

$$TM = \sum_{v,w \in T} \frac{k_v k_w}{2|E|} \delta(c_v, c_w) \tag{3}$$

in which $k_v$ represents a degree of a first tag node and $k_w$ represents a degree of a second tag node in which the degree of a particular tag node denotes how many nodes the particular tag node is connected to by edges. In the context of a bipartite graph according to the present disclosure, the degree of the particular tag node may indicate how many items a particular tag represents. $|E|$ represents a total number of tag nodes, and $\delta(c_v, c_w)$ represents a Kronecker delta function that returns a value of 1 if the variables $c_v$ and $c_w$ relating to membership of tag nodes v and w in the same clustering are equal (i.e., the nodes v and w are in the same clustering), and a 0 otherwise.

Given the tag modularity of the bipartite graph 125, the quadratic computation module 130 may be configured to determine one or more cluster descriptor sets 135 according to the following quadratic programming formulation:

$$(QP)\min \sum_{l=1}^{k} \sum_{j \in T} x_l(j) - P_1 \sum_{l=1}^{k} \sum_{i,j \in T} B_{i,j} x_l(i) x_l(j) + P_2 \sum_{l=1}^{k} \sum_{i \in C_l} (1 - z(i)) \sum_{j \in t_i} x_l(j) \tag{4}$$

in which the function, $x_l(j)$, is a first binary function that takes a value of 1 if tag $t_j$ is included in a set of tags $T_l$ that explains cluster $C_i$, and the function z(i) is a binary function that returns a value of 1 if item $s_i$ is covered. $B_{i,j}$ represents a n×n modularity matrix corresponding to the bipartite graph 125 in which each entry of the modularity matrix is a count of the number of connections between two nodes included in the graph. $P_1$ and $P_2$ represent weighting parameters in which $P_1$ represents tag locality and $P_2$ represents uncovered items included in the clusters of item nodes.

In some embodiments, tag locality may refer to a degree to which one or more tags provide a non-trivial explanation of the clustering of the item nodes. A tag node that provides a trivial explanation of the clustering of the item nodes may relate to a tag that provides an explanation for a majority of clusters of item nodes or all of the clusters of item nodes. For example, a particular tag node that has an edge connecting the particular tag node to item nodes included in multiple different clusters may be considered a trivial explanation of the clustering of the item nodes because the particular tag node may not be a basis for the clustering of the item nodes. For example, a particular dataset may include various images, and the images may be clustered into groups depending on whether the images depict a cat or a dog. A trivial tag for explaining the clustering of the images may include text descriptions such as “animal”, “pet”, or “four-legged animal”, while a non-trivial tag for explaining the clustering of the images may include text descriptions such as “feline”, “Siamese”, “Tabby”, “canine”, “Labrador”, or “Terrier”. In these and other embodiments, tag locality of a particular tag may be determined based on the modularity of the particular tag, such as according to Equation (3).

Additionally or alternatively, the quadratic programming formulation may penalize cluster descriptor sets including tags that fail to cover one or more of the item nodes. In these and other embodiments, coverage of a particular item node may indicate that the cluster descriptor set includes at least one tag that is related to the particular item node. In other words, an uncovered item node may not include a relationship with any of the tags included in a particular proposed cluster descriptor set.

According to the representation of the quadratic programming formulation in Equation (4), the quadratic programming formulation may preferentially bias towards cluster descriptor sets including tags that provide more non-trivial explanations of the clustering of the item nodes because the $P_1$ weighting parameter decreases a value of the quadratic programming formulation. In these and other embodiments, increasing the $P_1$ weighting factor may cause the quadratic programming formulation to more heavily prefer cluster descriptor sets that include tags with greater tag locality, while increasing the $P_2$ weighting factor may cause the quadratic programming formulation to more heavily penalize cluster descriptor sets that include uncovered item nodes. Additionally or alternatively, decreasing the $P_1$ weighting factor may cause the quadratic programming formulation to consider cluster descriptor sets that include tags with greater tag locality less preferentially, while decreasing the $P_2$ weighting factor may cause the quadratic programming formulation to less heavily penalize cluster descriptor sets that include uncovered item nodes.

The quadratic programming formulation described in Equation (4) may be subject to the following conditions:

$$\forall_l, \forall_{S_i} \in C_l: \sum_{j \in t_i} x_l(j) \geq z(i) \tag{5}$$

$$\forall_l: \sum_{S_i \in C_l} z(i) \geq M_l \tag{6}$$

$$\forall_j: \sum_{l=1}^{k} x_l(j) \leq 1 \tag{7}$$

$$\forall_j, \forall_l: x_l(j) \in \{0, 1\}, \forall_i: z(i) \in \{0, 1\} \tag{8}$$

In some embodiments, the quadratic programming formulation represented by Equation (4) may be solved as an optimization problem, such as a QUBO problem, by the quadratic computation module 130 in which each of the solutions to the quadratic programming formulation may include a respective cluster descriptor set 135. To convert the quadratic programming formulation to a QUBO problem, one or more of the conditions described by Equations (5)-(8) may be relaxed. For example, the condition represented by Equation (5) may be relaxed by introducing $m_{1,i} = \lceil \log_2 |t_i| \rceil$ slack binary variables $$\{y_{1,i,b}\}_{b=1}^{m_{i,1}}$$

to convert the inequality constraint to an equality constraint represented by:

$$\forall_l, \forall_{S_i} \in C_l: \tag{9}$$

-continued $$z(i) - \sum_{j \in t_i} x_i(j) + \sum_{b=1}^{m_{1,i}-1} 2^{b-1} y_{1,i,b} + \left(|t_i| + 1 - 2^{m_{1,i}-1}\right) y_{1,i,m_{1,i}} = 0$$

Additionally or alternatively, the condition represented by Equation (6) may be relaxed by introducing $m_{2,l} = \lceil \log_2(|C_l| - M_l) \rceil$ slack binary variables $$\{y_{2,l,b}\}_{b=1}^{m_{2,l}}$$

to convert the inequality constraint to an equality constraint represented by:

$$\forall_l: \tag{10}$$

$$M_l - \sum_{S_i \in C_l} z(i) + \sum_{b=1}^{m_{2,l}-1} 2^{b-1} y_{2,l,b} + \left(|C_l| - M_l + 1 - 2^{m_{2,l}-1}\right) y_{2,l,m_{2,l}} = 0$$

Additionally or alternatively, the condition represented by Equation (7) may be relaxed by introducing slack binary variables $y_{3,j}$ to convert the inequality constraint to an equality constraint represented by:

$$\forall_j: \sum_{l=1}^{k} x_l(j) + y_{3,j} - 1 = 0 \tag{11}$$

In these and other embodiments, the QUBO problem that represents the quadratic programming formulation may be solved by a computing process of the quadratic computation module 130 configured to determine solutions to binary optimization problems, such as a quantum computing process or computations performed by a digital annealer.

Modifications, additions, or omissions may be made to the system 100 without departing from the scope of the present disclosure. For example, the designations of different elements in the manner described is meant to help explain concepts described herein and is not limiting. For instance, in some embodiments, the graphing module 120 and the quadratic computation module 130 are delineated in the specific manner described to help with explaining concepts described herein but such delineation is not meant to be limiting. Further, the system 100 may include any number of other elements or may be implemented within other systems or contexts than those described.

Figure 3:
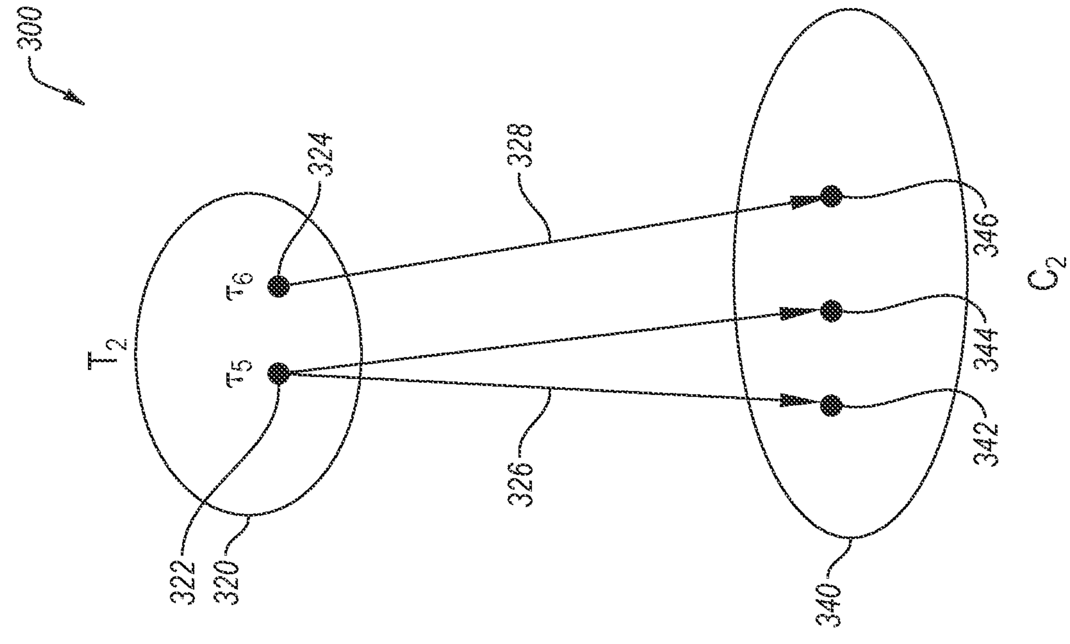
FIG. 3 illustrates a second example of two tag groups being applied to two clusters of nodes and explanation of the two clusters based on the two tag groups according to the present disclosure.
Figure 3:
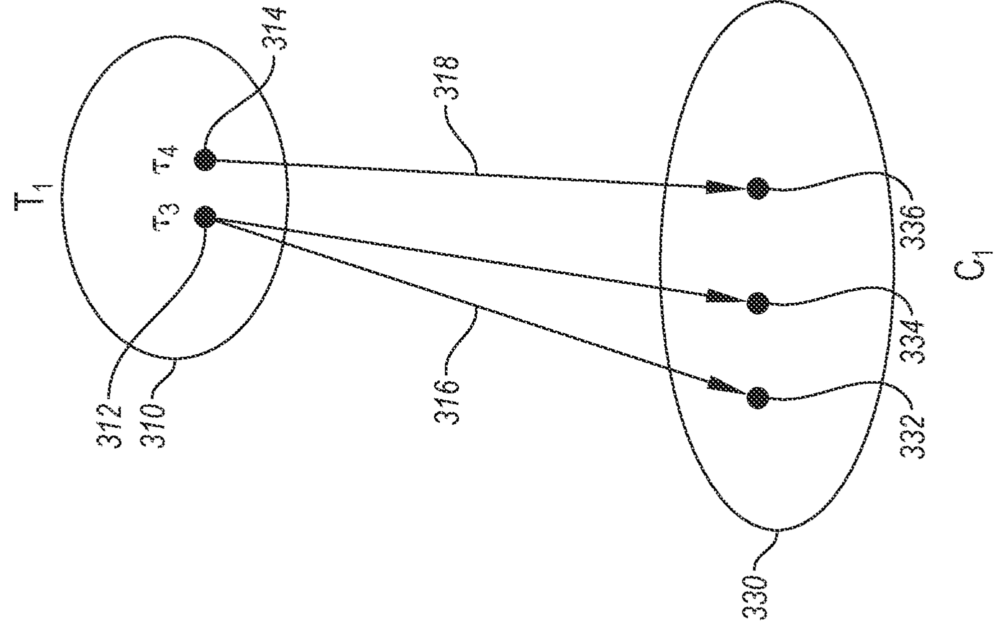

FIG. 3 illustrates an example of a particular cluster descriptor set 300, which includes two tag groups 310 and 320 being applied to two clusters of nodes 330 and 340, that may be an example of a particular cluster descriptor set 135 determined by solving the QUBO problem associated with Equations (4) and (9)-(11). The cluster descriptor set 300 may indicate that each of the tag groups 310 and 320 represents a cluster descriptor, or an explanation, of a respective cluster. In other words, a first tag group 310 may be an explanation of clustering of a first cluster of nodes 330, and a second tag group 320 may be an explanation of clustering of a second cluster of nodes 340.

As illustrated in the cluster descriptor set 300, the first tag group 310 may include a first tag 312 and a second tag 314 in which the first tag 312 is related in some way to a first item node 332 and a second item node 334 of the first cluster of nodes 330 as represented by a first edge 316, and the second tag 314 is related in some way to a third item node 336 of the first cluster of nodes 330 as represented by a second edge 318. In the second tag group 320, a third tag 322 may be related in some way to a fourth item node 342 and a fifth item node 344 of the second cluster of nodes 340 as represented by a third edge 326, and a fourth tag 324 may be related in some way to a sixth item node 346 of the second cluster of nodes 340 as represented by a fourth edge 328. The cluster descriptor set 300 may indicate that the grouping of the nodes 332, 334, and 336 included in the first cluster of nodes 330 may be explained by the tags 312 and 314 included in the first tag group 310 and that the grouping of the nodes 342, 344, and 346 included in the second cluster of nodes 340 may be explained by the tags 322 and 324 included in the second tag group 320.

The cluster descriptor set 300 may represent a way to explain clustering of data in various contexts. For example, the clusters of nodes 330 and 340 of a particular cluster descriptor set may represent users of a social media platform, and the tag groups 310 and 320 may represent social media behavior and characteristics that may be similar between one or more users of the social media platform. More particularly, the users may be TWITTER® users, and the social media behavior and characteristics may include hashtags used by the users. The TWITTER® users may be grouped into two or more clusters based on the users' behaviors while using TWITTER®. For example, the users may be sorted into a first group representing pro-Republican users or a second group representing pro-Democratic users, and the hashtags may include the most popular hashtags used on TWITTER® relating to politics (e.g., presidential campaign slogans, political candidate names, political party affiliations, or relevant political events). The particular cluster descriptor set may indicate one or more groups of hashtags (i.e., tag groups 310 and 320) in which each group of hashtags provides an explanation of why the TWITTER® users (i.e., clusters of nodes 330 and 340) were included in the same group. In this and other examples, the TWITTER® users who are included in the first group representing pro-Republican users may be explained by hashtags that include phrases such as "Trump", "Trump2016", or "GOPdebate", and the TWITTER® users who are included in the second group representing pro-Democratic users may be explained by hashtags that include phrases such as "Clinton", "Clinton2016", or "ImWithHer".

As another example, a particular cluster descriptor set may involve clusters of item nodes in which each clustered item node represents a Medical Subject Heading (a "MeSH term") that is manually curated with respect to biomedical citations included in journal articles, and each of the tags represents a widely recognized infectious disease such that grouping of the MeSH terms may be explained by one or more of the infectious diseases. In this and other examples, the MeSH terms may include, for example, "SARS-CoV-2", "Antiretroviral Therapy", "Mumps", "Bites and Stings", "Pandemics", "Infant", "Animals", "Sexual Behavior", or any other terms used in relation to biomedical citations corresponding to journal articles, and the infectious diseases may include, for example, COVID-19, HIV, measles, and rabies.

As additional or alternative examples, a particular cluster descriptor set may involve clusters of item nodes relating to gene sequences, image sets relating to different subject matters, and text passages. Respective tags that correspond to the clusters of item nodes may involve genetic expressions and characteristics, labels for the images, and categorical descriptions of the text passages.

Figure 4:
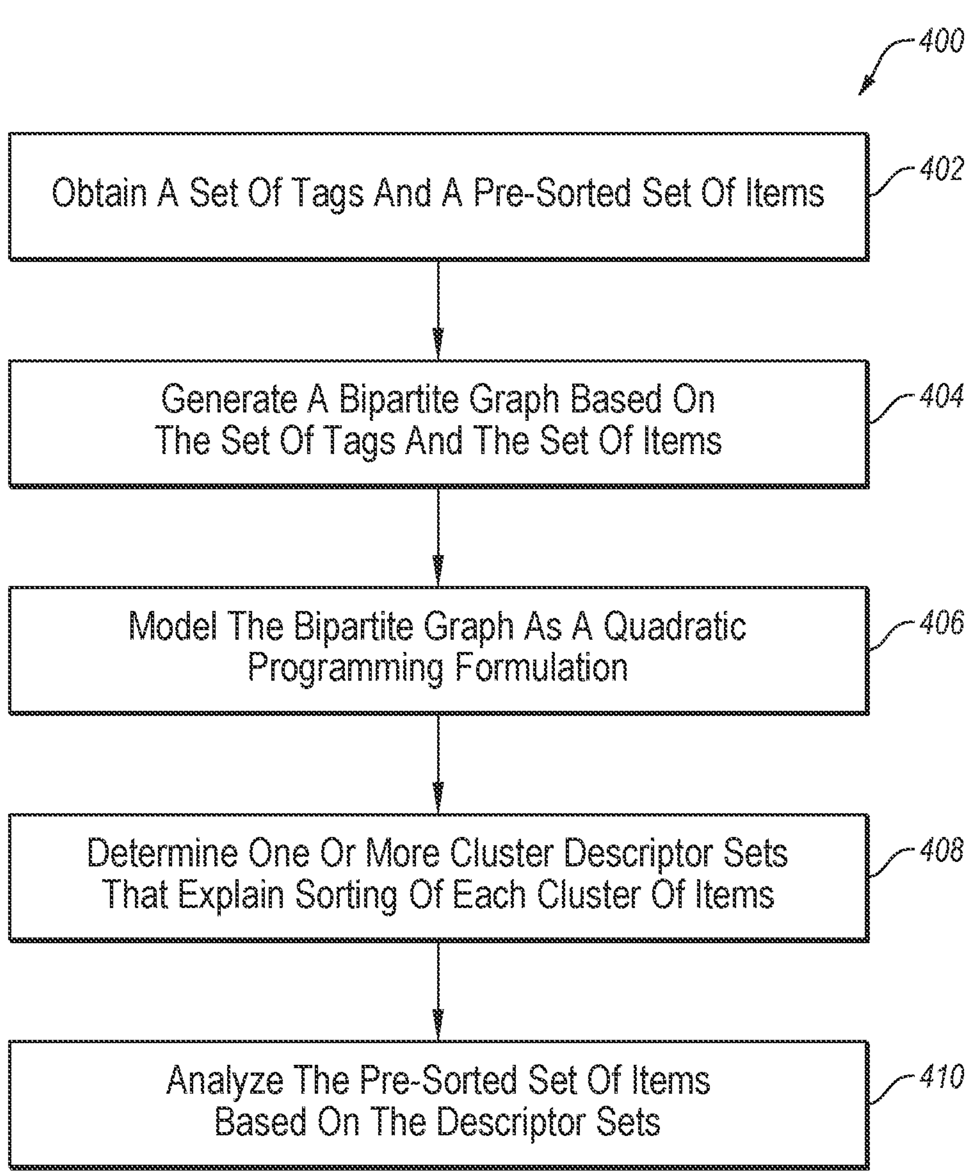
FIG. 4 is a method flowchart of generating cluster descriptors according to the present disclosure.

FIG. 4 is a flowchart of a method 400 of generating cluster descriptors according to the present disclosure. The method 400 may be performed by any suitable system, apparatus, or device. For example, the graphing module 120 and the quadratic computation module 130 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a set of tags and a pre-sorted set of items are obtained. In some embodiments, the set of tags and the pre-sorted set of items may each include nodes corresponding to nodes associated with a graph that represents a dataset that includes the items of the pre-sorted set of items and the tags of the set of tags. The nodes included in the pre sorted set of items (i.e., item nodes) may be sorted into one or more clusters based on similarities between the item nodes. Each of the item nodes may be related to one or more nodes included in the set of tags (i.e., tag nodes), and the relationships between the item nodes and the tag nodes may be represented by edges in the graph that represents the dataset.

At block 404, a bipartite graph may be generated based on the set of tags and the pre-sorted set of items. As described above in relation to FIGS. 1, 2, and 3, the bipartite graph may include two or more disjointed groups of graph nodes. For example, a first disjointed group of graph nodes may include nodes corresponding to the tags included in the set of tags and a second disjointed group of graph nodes may include nodes corresponding to the items included in the pre-sorted set of items.

At block 406, the bipartite graph may be modeled as a quadratic programming formulation. In some embodiments, the quadratic programming formulation of the bipartite graph may be represented by Equations (4)-(8) as described in relation to FIG. 1.

At block 408, one or more cluster descriptor sets may be determined in which each cluster descriptor set includes one or more tags from the set of tags and explains sorting of a cluster of items. In some embodiments, generating the cluster descriptor sets may involve converting the quadratic programming formulation that represents the bipartite graph into a QUBO problem or any other optimization problems, such as according to Equations (9)-(11) as described in relation to FIG. 1. In these and other embodiments, solving the QUBO problem may result in determination of the one or more cluster descriptor sets that explain the sorting of the clusters of items.

At block 410, the pre-sorted set of items may be analyzed based on the one or more determined cluster descriptor sets. In some embodiments, analyzing the pre-sorted set of items may involve providing a human-interpretable explanation regarding how the set of items are sorted. Because the pre-sorting of the set of items may provide no indication or an ambiguous indication regarding how the items included in the set are sorted, the cluster descriptor sets may facilitate determining how the set of items was pre-sorted and/or further analysis of the set of items. For example, a particular set of items may be a group of users of a social media platform, and the group of users may be pre-sorted and labeled as Republicans or Democrats by an artificial intelligence system. However, a reasoning or an explanation for why a particular user in the group of users is included in the Republican sub-group or the Democrat sub-group may not be provided by the artificial intelligence system. In this and other examples, the cluster descriptor sets may give an explanation that pre-sorting of the Republican sub-group or the Democrat sub-group was based on a prevalence of one or more hashtags used by users included in the Republican sub-group or the Democrat sub-group.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
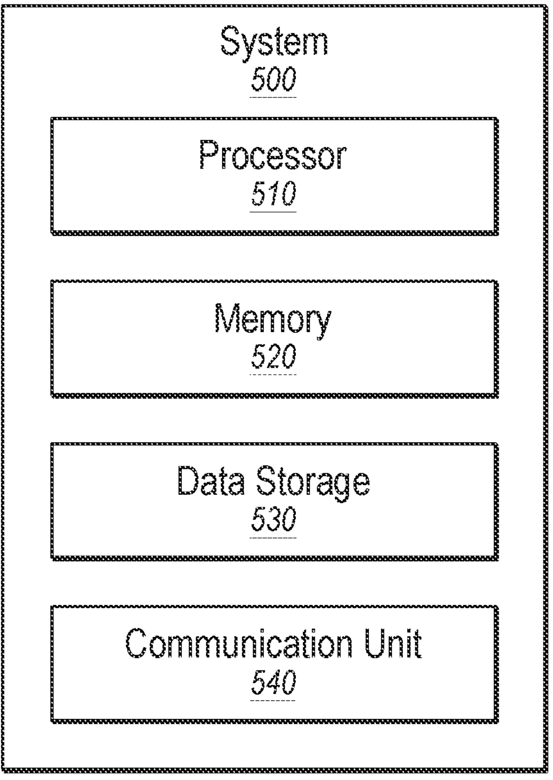
FIG. 5 is an example computer system according to the present disclosure.

FIG. 5 is an example computer system 500, according to at least one embodiment described in the present disclosure. The computing system 500 may include a processor 510, a memory 520, a data storage 530, and/or a communication unit 540, which all may be communicatively coupled. Any or all of the system 100 of FIG. 1 may be implemented as a computing system consistent with the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to cause the computing system 500 to perform the operations of the method 400 of FIG. 4. For example, the computing system 500 may execute the program instructions to obtain a set of tags and a pre-sorted set of items, generate a bipartite graph based on the set of tags and the clusters of items, model the bipartite graph as a quadratic programming formulation, and determining one or more cluster descriptor sets that explain the sorting of each cluster of items.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may include the pre sorted set of items 110, the set of tags 115, the bipartite graph 125, or the cluster descriptor sets 135 of FIG. 1. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a particular operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

obtaining a set of tags and a set of items, wherein each item of the set of items is pre-sorted into a cluster by an unsupervised machine learning model and each item corresponds to one or more tags included in the set of tags;

generating a graph that includes the set of tags as a first set of nodes and the clusters of items as a second set of nodes of the graph, wherein relationships between tags and items are represented as edges between first nodes associated with the first set of nodes and second nodes associated with the second set of nodes;

modeling the graph as a quadratic programming formulation;

converting the quadratic programming formulation into a quadratic unconstrained binary optimization (QUBO)

problem, the converting into the QUBO problem allowing for solving of the quadratic programming formulation using a digital annealer, wherein the quadratic programming formulation of the graph includes one or more weights corresponding to one or more metrics including at least one of: a tag redundancy, a node coverage, a tag balance, and a tag locality that indicates a degree to which the tags provide indication of how the one or more clusters of items were pre-sorted, and the quadratic programming formulation is represented by $$\min\sum_{l=1}^{k}\sum_{j\in T}x_l(j)-P_1\sum_{l=1}^{k}\sum_{i,j\in T}B_{i,j}x_l(i)x_l(j)+P_2\sum_{l=1}^{k}\sum_{i\in C_l}(1-z(i))\sum_{j\in t_i}x_l(j)$$

"$x_l$(j)" represents a first binary function, "T" represents the set of tags, "$C_l$" represents the cluster, "z(i)" represents a second binary function, "$B_{i,j}$" represents a n×n modularity matrix corresponding to the graph, "$P_1$" and "$P_2$" represent weighting parameters in which "$P_1$" represents a tag locality and "$P_2$" represents uncovered items included in the cluster;

solving the QUBO problem using the digital annealer;

determining one or more cluster descriptor sets that each include one or more of the tags based on the solving of the QUBO problem, each of the cluster descriptor sets providing an indication of how one or more clusters of items were pre-sorted;

analyzing the set of items based on the one or more cluster descriptor sets; and providing an explanation regarding clustering of the set of items by the unsupervised machine learning model based on the analyzing of the set of items.

2. The method of claim 1, wherein the set of tags is a plurality of hashtags and the set of items is a plurality of user accounts on a social media platform.

3. The method of claim 1, wherein the set of tags is a plurality of image labels and the set of items is a plurality of images.

4. The method of claim 1, wherein the set of tags is a plurality of gene characteristics and the set of items is a plurality of gene sequences.

5. One or more non-transitory computer-readable storage media configured to store instructions that, in response to being executed, cause a system to perform operations, the operations comprising:

obtaining a set of tags and a set of items, wherein each item of the set of items is pre-sorted into a cluster by an unsupervised machine learning model and each item corresponds to one or more tags included in the set of tags;

generating a graph that includes the set of tags as a first set of nodes and the clusters of items as a second set of nodes of the graph, wherein relationships between tags and items are represented as edges between first nodes associated with the first set of nodes and second nodes associated with the second set of nodes;

modeling the graph as a quadratic programming formulation;

converting the quadratic programming formulation into a quadratic unconstrained binary optimization (QUBO) problem, the converting into the QUBO problem allowing for solving of the quadratic programming formulation using a digital annealer, wherein the quadratic programming formulation of the graph includes one or more weights corresponding to one or more metrics including at least one of: a tag redundancy, a node coverage, a tag balance, and a tag locality that indicates a degree to which the tags provide indication of how the one or more clusters of items were pre-sorted, and the quadratic programming formulation is represented by $$\min\sum_{l=1}^{k}\sum_{j\in T}x_l(j)-P_1\sum_{l=1}^{k}\sum_{i,j\in T}B_{i,j}x_l(i)x_l(j)+P_2\sum_{l=1}^{k}\sum_{i\in C_l}(1-z(i))\sum_{j\in t_i}x_l(j)$$

"$x_l$(j)" represents a first binary function, "T" represents the set of tags, "$C_l$" represents the cluster, "z(i)" represents a second binary function, "$B_{i,j}$" represents a n×n modularity matrix corresponding to the graph, "$P_1$" and "$P_2$" represent weighting parameters in which "$P_1$" represents a tag locality and "$P_2$" represents uncovered items included in the cluster;

solving the QUBO problem using the digital annealer;

determining one or more cluster descriptor sets that each include one or more of the tags based on the solving of the QUBO problem, each of the cluster descriptor sets providing an indication of how one or more clusters of items were pre-sorted;

analyzing the set of items based on the one or more cluster descriptor sets; and providing an explanation regarding clustering of the set of items by the unsupervised machine learning model based on the analyzing of the set of items.

6. The one or more non-transitory computer-readable storage media of claim 5, wherein the set of tags is a plurality of hashtags and the set of items is a plurality of user accounts on a social media platform.

7. The one or more non-transitory computer-readable storage media of claim 5, wherein the set of tags is a plurality of image labels and the set of items is a plurality of images.

8. The one or more non-transitory computer-readable storage media of claim 5, wherein the set of tags is a plurality of gene characteristics and the set of items is a plurality of gene sequences.

9. A system comprising:

one or more processors; and one or more non-transitory computer-readable storage media configured to store instructions that, in response to being executed, cause the system to perform operations, the operations comprising:

obtaining a set of tags and a set of items, wherein each item of the set of items is pre-sorted into a cluster by an unsupervised machine learning model and each item corresponds to one or more tags included in the set of tags;

generating a graph that includes the set of tags as a first set of nodes and the clusters of items as a second set of nodes of the graph, wherein relationships between tags and items are represented as edges between first nodes associated with the first set of nodes and second nodes associated with the second set of nodes;

modeling the graph as a quadratic programming formulation;

converting the quadratic programming formulation into a quadratic unconstrained binary optimization (QUBO) problem, the converting into the QUBO problem allowing for solving of the quadratic programming formulation using a digital annealer, wherein the quadratic programming formulation of the graph includes one or more weights corresponding to one or more metrics including at least one of: a tag redundancy, a node coverage, a tag balance, and a tag locality that indicates a degree to which the tags provide indication of how the one or more clusters of items were pre-sorted, and the quadratic programming formulation is represented by $$\min\sum_{l=1}^{k}\sum_{j\in T}x_l(j)-P_1\sum_{l=1}^{k}\sum_{i,j\in T}B_{i,j}x_l(i)x_l(j)+P_2\sum_{l=1}^{k}\sum_{i\in C_l}(1-z(i))\sum_{j\in t_i}x_l(j)$$

"$x_l$(j)" represents a first binary function, "T" represents the set of tags, "$C_l$" represents the cluster, "z(i)" represents a second binary function, "$B_{i,j}$" represents a n×n modularity matrix corresponding to the graph, "$P_1$" and "$P_2$" represent weighting parameters in which "$P_1$" represents a tag locality and "$P_2$" represents uncovered items included in the cluster;

solving the QUBO problem using the digital annealer;

determining one or more cluster descriptor sets that each include one or more of the tags based on the solving of the QUBO problem, each of the cluster descriptor sets providing an indication of how one or more clusters of items were pre-sorted;

analyzing the set of items based on the one or more cluster descriptor sets; and providing an explanation regarding clustering of the set of items by the unsupervised machine learning model based on the analyzing of the set of items.

10. The system of claim 9, wherein the set of tags is a plurality of hashtags and the set of items is a plurality of user accounts on a social media platform.

11. The system of claim 9, wherein the set of tags is a plurality of image labels and the set of items is a plurality of images.

12. The system of claim 9, wherein the set of tags is a plurality of gene characteristics and the set of items is a plurality of gene sequences.

* * * * *